United States Patent
Currivan et al.

(10) Patent No.: US 7,050,516 B2
(45) Date of Patent: May 23, 2006

(54) SYSTEM AND METHOD FOR PERIODIC NOISE AVOIDANCE IN DATA TRANSMISSION SYSTEMS

(75) Inventors: Bruce J. Currivan, Irvine, CA (US);
Thomas J. Kolze, Phoenix, AZ (US);
Daniel H. Howard, Atlanta, GA (US);
Nabil Yousef, Foothill Ranch, CA (US);
William Ngai, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 270 days.

(21) Appl. No.: 10/391,555

(22) Filed: Mar. 20, 2003

(65) Prior Publication Data

US 2004/0184571 A1 Sep. 23, 2004

(51) Int. Cl.
*H03D 1/04* (2006.01)
*H03D 1/06* (2006.01)
*H03K 5/01* (2006.01)
*H03K 6/04* (2006.01)

(52) U.S. Cl. ............... 375/346; 375/355; 370/516

(58) Field of Classification Search .......... 375/224, 375/227, 254, 285, 259, 342, 346, 350, 354, 375/355; 714/776; 370/252, 516
See application file for complete search history.

(56) References Cited

U.S. PATENT DOCUMENTS

| | | | |
|---|---|---|---|
| 5,029,118 A * | 7/1991 | Nakajima et al. ............ 702/195 |
| 5,502,770 A * | 3/1996 | Kuo et al. ................. 381/71.9 |
| 5,537,443 A * | 7/1996 | Yoshino et al. ............. 375/340 |
| 5,764,598 A * | 6/1998 | Okayasu ..................... 368/120 |
| 5,887,075 A * | 3/1999 | Kruppa ....................... 382/139 |
| 5,966,684 A * | 10/1999 | Richardson et al. ........ 702/191 |
| 6,701,129 B1 * | 3/2004 | Hashem et al. .......... 455/67.11 |
| 6,721,569 B1 * | 4/2004 | Hashem et al. ............. 455/450 |
| 6,741,185 B1 * | 5/2004 | Shi et al. .................. 340/853.2 |
| 6,823,022 B1 * | 11/2004 | Fullerton et al. ............ 375/285 |
| 2002/0186793 A1 | 12/2002 | Kolze et al. |
| 2003/0012127 A1 | 1/2003 | Kolze |
| 2004/0125743 A1 * | 7/2004 | Hashem et al. ............. 370/208 |

FOREIGN PATENT DOCUMENTS

JP 401265181 A * 11/1989

* cited by examiner

Primary Examiner—Jean B. Corrielus
(74) Attorney, Agent, or Firm—Sterne, Kessler, Goldstein & Fox P.L.L.C.

(57) ABSTRACT

A system for periodic noise avoidance including a timing discriminator receiving an input signal from a communications channel. The input signal includes data packets and empty slots with periodic noise. The timing discriminator outputs a first error measurement of periodic noise width and a second error measurement of periodic noise position. A first loop filter inputs the first error measurement and outputs a width of the empty slots. A second loop filter inputs the second error measurement and outputs a frequency of the periodic noise. An oscillator inputs the width of the empty slots and the frequency, and outputs an empty slot waveform to the timing discriminator.

20 Claims, 10 Drawing Sheets

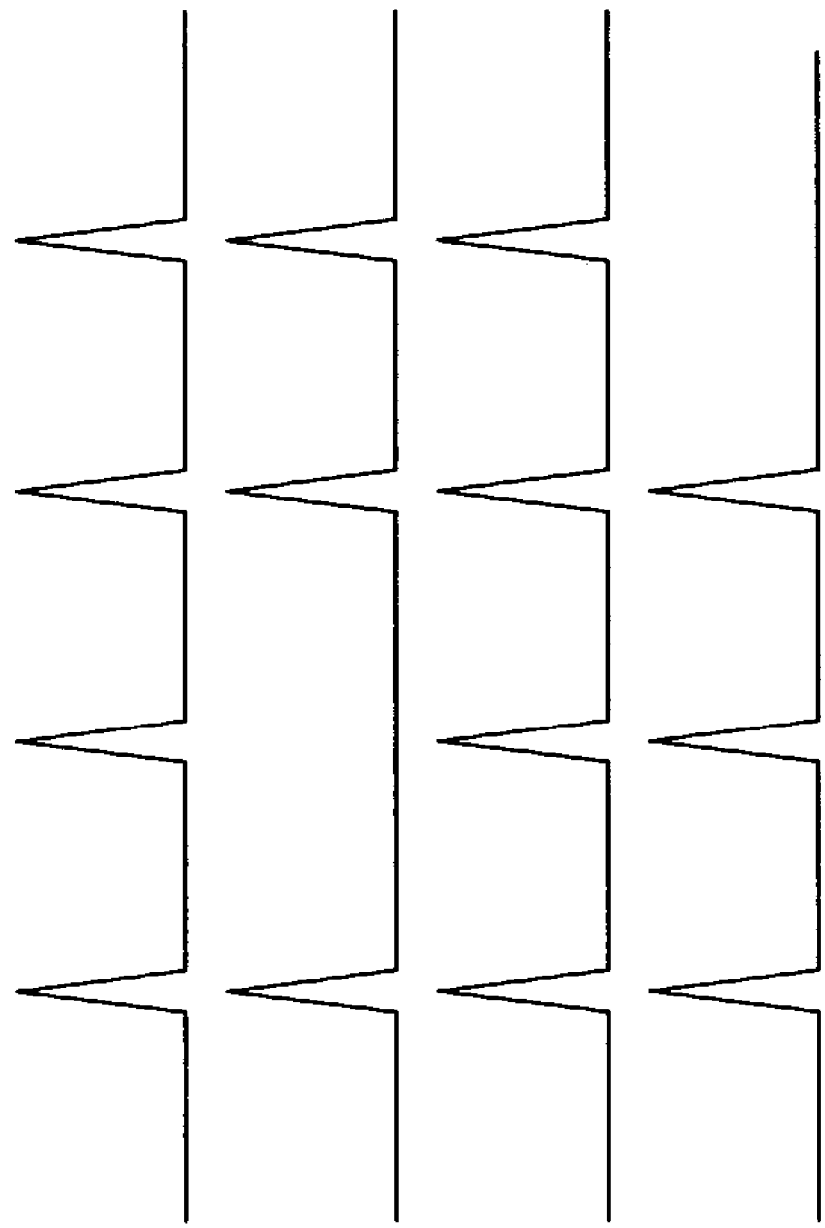

SYSTEM AND METHOD FOR PERIODIC NOISE AVOIDANCE IN DATA TRANSMISSION SYSTEMS

CROSS-REFERENCE TO RELATED APPLICATIONS

This application is related to U.S. patent application Ser. No. 10/000,415, filed Nov. 2, 2001, entitled DETECTION AND MITIGATION OF TEMPORARY IMPAIRMENTS IN A COMMUNICATIONS CHANNEL, and to U.S. patent application Ser. No. 10/237,853, filed Sep. 9, 2002, entitled DETECTION AND MITIGATION OF TEMPORARY IMPAIRMENTS IN A COMMUNICATIONS CHANNEL USING SCDMA, which are both incorporated by reference herein.

BACKGROUND OF THE INVENTION

1. Field of the Invention

The present invention relates to TDMA and SCDMA transmission systems, and more particularly, to a system and method for optimizing system performance in the presence of periodic noise.

2. Related Art

It is well known in the communications industry that noise or disturbances in a communications channel can adversely affect the performance of data communications equipment using the channel. For example, it is well known that cable modems are constrained by noise in the channel to operate at less than their full capacity. This is why cable modems do not always operate at their advertised maximum data rates. Common sources of periodic burst noise often include AC power lines, AC motors, arcing components of motors, etc. Periodic impulse noise at the 60 Hz rate, which may be produced by radiating sources such as light dimmers, vacuum cleaners, blenders, etc., adversely affects data communications equipment at the customer premises. While these impairments may not adversely affect dial-up modems to a great extent, it is believed that they significantly adversely affect high-speed modems, such as cable modems, because these types of modems utilize higher frequencies where pickup from radiating sources in the 60 Hz range may be greater.

It is desirable to be able to parameterize the periodic noise, such that the amount of information being transmitted on the physical channel is as large as possible.

BRIEF SUMMARY OF THE INVENTION

The present invention is directed to a method and system for periodic noise avoidance in data transmission systems that substantially obviates one or more of the problems and disadvantages of the related art.

In one aspect of the present invention there is provided a system for periodic noise avoidance including a timing discriminator receiving an input signal from a communications channel. The input signal includes data packets and empty slots with periodic noise. The timing discriminator outputs a first error measurement of periodic noise width and a second error measurement of periodic noise position. A first loop filter inputs the first error measurement and outputs a width of the empty slots. A second loop filter inputs the second error measurement and outputs a frequency of the periodic noise. An oscillator inputs the width of the empty slots and the frequency, and outputs an empty slot waveform to the timing discriminator.

In another aspect there is provided a method of periodic noise avoidance including inputting a signal from a communications channel, the signal including data packets and empty slots with periodic noise, and outputting a first error measurement of periodic noise width and a second error measurement of periodic noise position. A width of the empty slots is outputted based on the first error measurement. A frequency of the periodic noise is outputted based on the second error measurement. An empty slot waveform is outputted based on the width of the empty slots and the frequency.

In another aspect there is provided a method of periodic noise avoidance including inputting a signal from a communications channel, the input signal including data packets and periodic noise, determining a repetition rate of the periodic noise width and a pulse width of the periodic noise, and adjusting transmission parameters of data transmitted during the periodic noise based on the repetition rate of the periodic noise width and the pulse width of the periodic noise.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE FIGURES

The present invention will be described with reference to the accompanying drawings. The drawing in which an element first appears is typically indicated by the leftmost digit(s) in the corresponding reference number.

FIGS. 5–7 illustrate the use of a raster method for initial acquisition of periodic burst noise parameters.

DETAILED DESCRIPTION OF THE INVENTION

Figure 1:
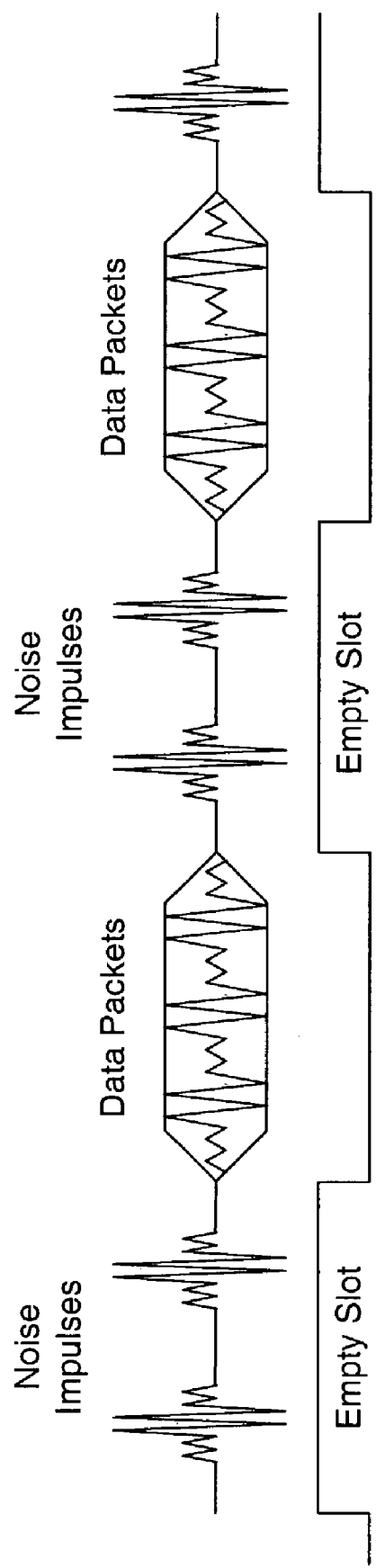
FIG. 1 illustrates noise and data on a transmission channel as a function of time.

FIG. 1 illustrates transmission in a cable modem system, showing periodic noise impulses and data packets being transmitted. In this TDMA or SCDMA transmission system, data is not transmitted where the noise impulses are located, and that time slot is designated as an empty slot. Data packets are transmitted between the empty slots, with the users transmitting data during the "data slot".

Figure 2:
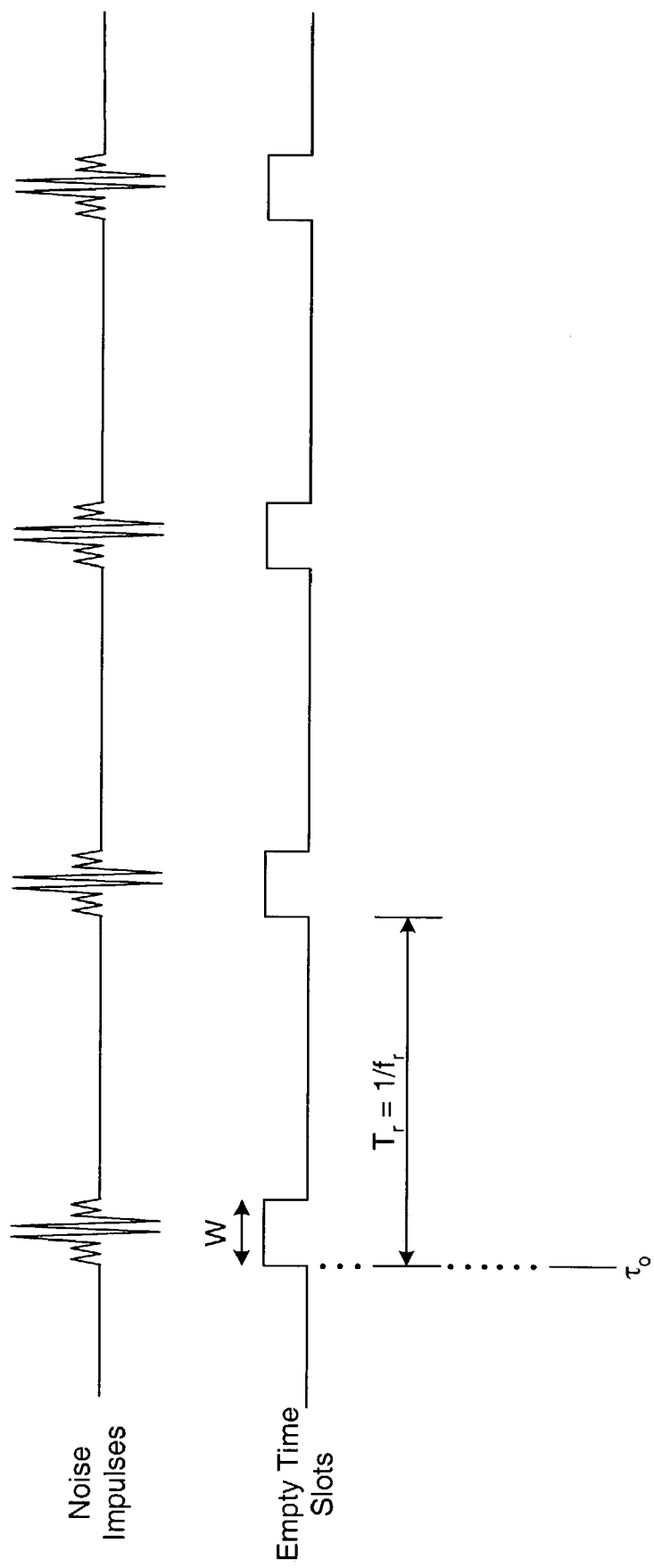
FIG. 2 illustrates commonly used parameters defining periodic noise impulses of FIG. 1.

With reference to FIG. 2, the periodic noise impulses are shown in the upper portion of the figure, and the empty time slots of width w are shown in the bottom portion of the figure. The empty time slots have a period $T_r$, which is inversely proportional to the repetition frequency $f_r$ and a phase $\tau_0$. For purposes of this discussion, assume that there is only one source of periodic noise, and the periodic noise occurs at just one frequency $f_r$, however the invention is not limited to one embodiment.

Figure 3A:
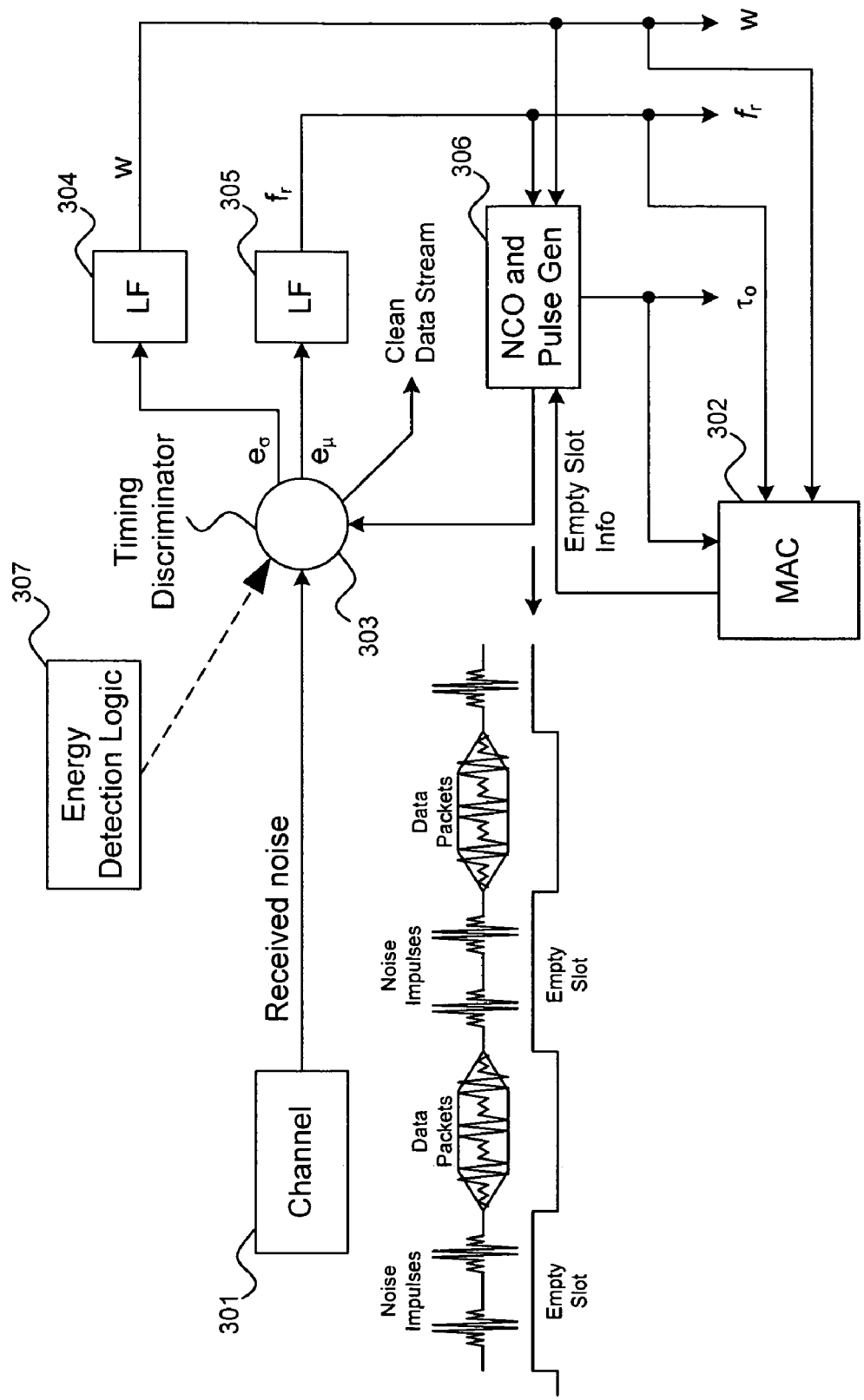
FIG. 3A shows a system of the present invention used to optimize channel transmission performance.

FIG. 3A illustrates a block diagram of the present invention. As may be seen in FIG. 3A, data and noise are received on a channel 301. Channel 301 may be a coaxial cable, a fiberoptic cable, or a wireless transmission system. It will be appreciated that the lower left hand portion of the figure is a replica of FIG. 1.

The signal received from the channel 301 is inputted into a timing discriminator 303, whose purpose is to align the empty slots as precisely as possible with the periodic burst noise. $\sigma$ and $\mu$ in FIG. 3A refer to a measure of burst noise width ($\sigma$) and a measure of burst noise position ($\mu$), respectively. These measures may be defined as they are commonly defined for statistical purposes in Gaussian normal functions, or they may have alternative definitions. For example, the $\mu$ may be a centroid (a center of gravity of the energy) of the burst. It may also be defined as the geometric center of the burst. Other definitions are also possible.

$\sigma$ a may be calculated using the definition of the standard deviation in statistics, such that approximately 67% of the burst noise energy is captured by the $2\sigma$ window. Alternatively, it may be defined such that three quarters, or four fifths, of the energy of the noise burst is captured by the window of $2\sigma$. Note that the width of the empty slot w is not necessarily $2\sigma$, but may be, e.g., wider than $2\sigma$.

The timing discriminator 303 outputs two error measures, $e_\sigma$ and $e_\mu$. In a case where the error is 0, i.e., the estimated pulse width w and the estimated pulse center $\mu$ is exactly as measured, the error outputs $e_\sigma$ and $e_\mu$ are zero. To the extent the estimates of the errors $e_\sigma$, $e_\mu$ are non-zero (in other words, the estimates of the burst noise repetition frequency $f_r$ and width w of the empty slots) is less than ideal, the error estimates will be nonzero. The error estimates $e_\sigma$ and $e_\mu$ are fed into loop filters 304 and 305, respectively. The loop filters 304 and 305 output a revised estimate of w and $f_r$, which is then outputted to an empty slot scheduler, e.g., a media access controller (MAC) 302 (also discussed below). Estimates of w and $f_r$ are also fed into a NCO (numerically controlled oscillator) and pulse generator 306. The NCO and pulse generator 306 outputs a phase estimate $\tau_0$ of the periodic noise.

The NCO and pulse generator 306 generate the empty slots waveform, which is fed back to the timing discriminator 303, where the timing discriminator will use the $f_r$ and w estimates on the next iteration of estimating $e_\sigma$ and $e_\mu$.

Collectively, the timing discriminator 303, the loop filters 304 and 305, and the NCO and pulse generator 306 may be thought of as a phase locked loop (PLL) that, unlike conventional phase-lock loops, outputs three quantities—phase $\tau_0$, frequency $f_r$, and pulse width w. The phase estimate $\tau_0$ is adjusted by adjusting the NCO 306.

The MAC 302 can adjust the data transmission characteristics of the channel users based on the $\tau_0$, $f_r$, w. For example, a smaller width of the empty slot allows higher bandwidth, since more time is allocated to data transmission.

Further with reference to FIG. 3A, an energy detection logic 307 may be present in the system. The purpose of the energy detection logic 307 is to ensure that error estimates $e_\sigma$ and $e_\mu$ are performed only when there is periodic noise in the empty slot. Also, the energy detection logic 307 may also be used during the acquisition process discussed below, when it is necessary to provide initial estimates of w and $f_r$. The timing discriminator 303 can also "toss out" any burst that is too dissimilar from the bursts that were being tracked.

It will also be appreciated that although a MAC 302 is used as an empty slot scheduler in the above discussion, other forms of schedulers may be used, as long as noise pulse timing information ($\tau_0$ and $f_r$) are fed to the scheduler.

It will also be appreciated that where the CMTS (headend) includes a noise canceller, providing an estimate of w to the noise canceller alone is useful, even without the additional timing information. Furthermore, it is possible to provide just an estimate of $\tau_0$ and w to the MAC, if $\tau_0$ is sent repeatedly, every time a noise burst starts. This, obviously, will entail higher overhead than providing $\tau_0$, $f_r$ and w.

Typical numbers for $f_r$ range between 1 Hz and 1 KHz, and typical numbers for w range between 1 μsec and 1 msec.

Figure 3B:
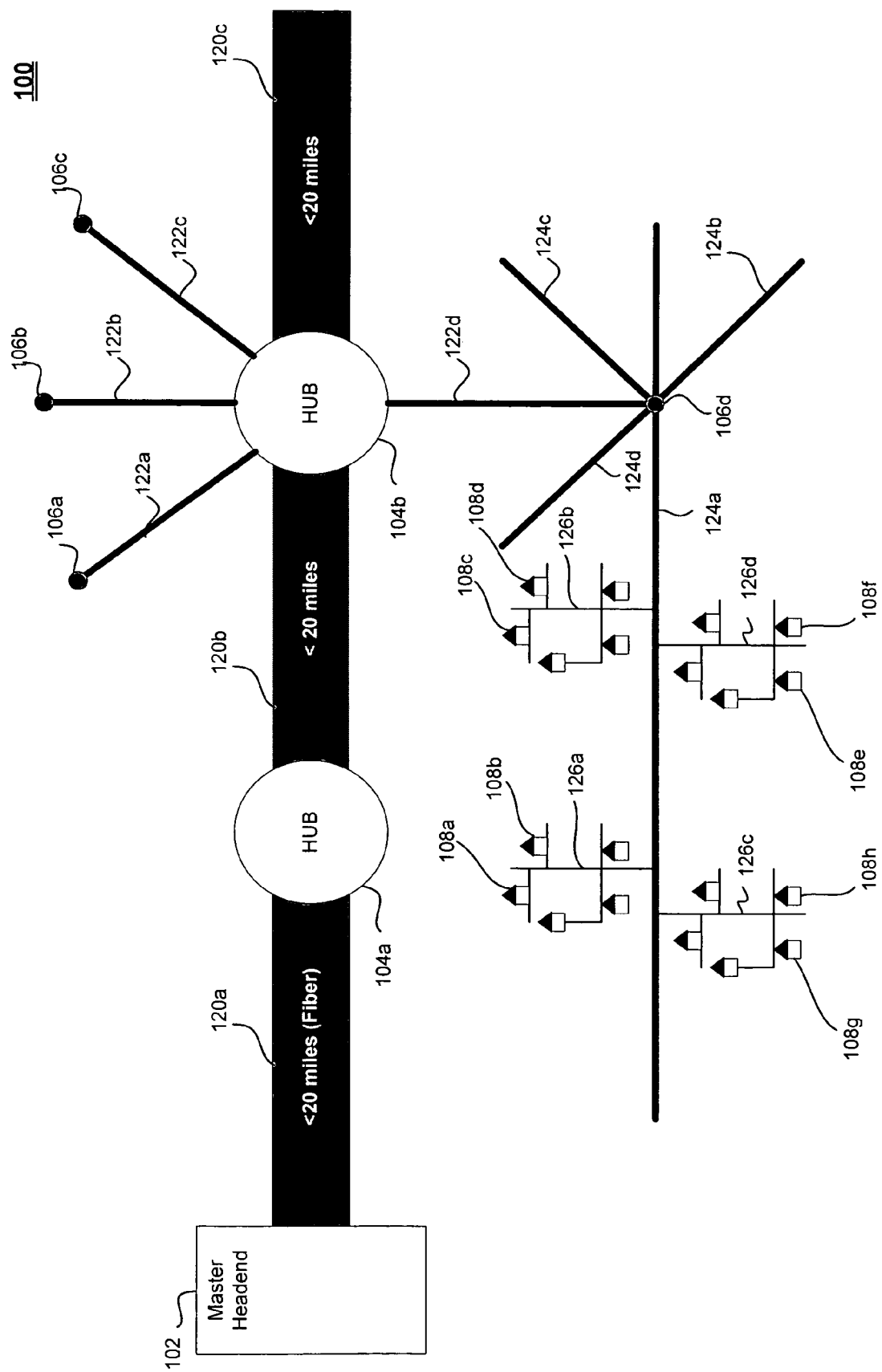
FIG. 3B is a block diagram of an exemplary cable-based communications system.

FIG. 3B is a block diagram of an exemplary cable based communications system 100 that may utilize the present invention. The communications system 100 includes a master headend 102, hubs 104a–b, nodes 106a–d, and a plurality of subscribers 108. The subscribers 108 exchange bidirectional communications traffic with a master headend 102 through various optical and electrical media. For instance, communications traffic is passed between the master headend 102 and the hub(s) 104 through optical media, while communications traffic is passed between the nodes 106 and the subscribers 108 through electrical media. These optical and electrical media are described below.

Fiber optic backbone segments 120a–c provide an interconnection between the master headend 102 and the hubs 104. As shown in FIG. 3B, the backbone segments 120a–c each have exemplary distances of twenty miles or less. However, distances greater than twenty miles are within the scope of the present invention.

The nodes 106 each provide an interface between optical communications media and electrical communications media. As shown in FIG. 3B the fiber optic lines 122 establish connections between the hubs 104 and the nodes 106. For example, the fiber optic line 122d connects the hub 104b and the node 106d. Also, the nodes 106 are each coupled to one or more coaxial cables 124. The coaxial cables 124, in conjunction with coaxial cables 126, exchange electrical signals with the subscribers 108. For example, the coaxial cable 124a and the coaxial cable 126d connects the node 106d with the subscribers 108e and 108f.

Traffic in the communications system 100 includes upstream traffic and downstream traffic. Downstream traffic is received by the subscribers 108 from system elements, such as the master headend 102.

In contrast, upstream traffic is originated by the subscribers 108 and directed to system elements, such as the master headend 102. For the coaxial cables 124, the upstream and downstream traffic are each allocated to a particular frequency band. For example, upstream traffic may be allocated to a 5–42 MHz frequency band, while downstream traffic may be allocated to a 54–860 MHz frequency band. One or more frequency channels exist within these frequency bands that provide for the transmission of signals. These signals are modulated according to a digital modulation scheme, such as quadrature amplitude modulation (QAM) or quadrature phase shift keying (QPSK).

Multiple subscribers 108 share the electrical and optical communications media of the communications system 100. For instance, in the context of the coaxial cables 124 and 126, the subscribers 108 transmit signals across the same frequency channel in the same coaxial cable 124. To accommodate such frequency channel sharing, the communications system 100 employs a multiple access technique, such as TDMA for upstream traffic.

TDMA is a transmission scheme that allows a number of subscribers 108 to transmit information across a single frequency channel without interference. This is enabled by allocating unique time slots to each subscriber 108. According to TDMA, the subscribers 108 send upstream transmissions across a channel during one or more time slots that occur within a TDMA frame. Various types of time slots exist. Three examples are reservation slots, contention slots, and maintenance slots.

Figure 3C:
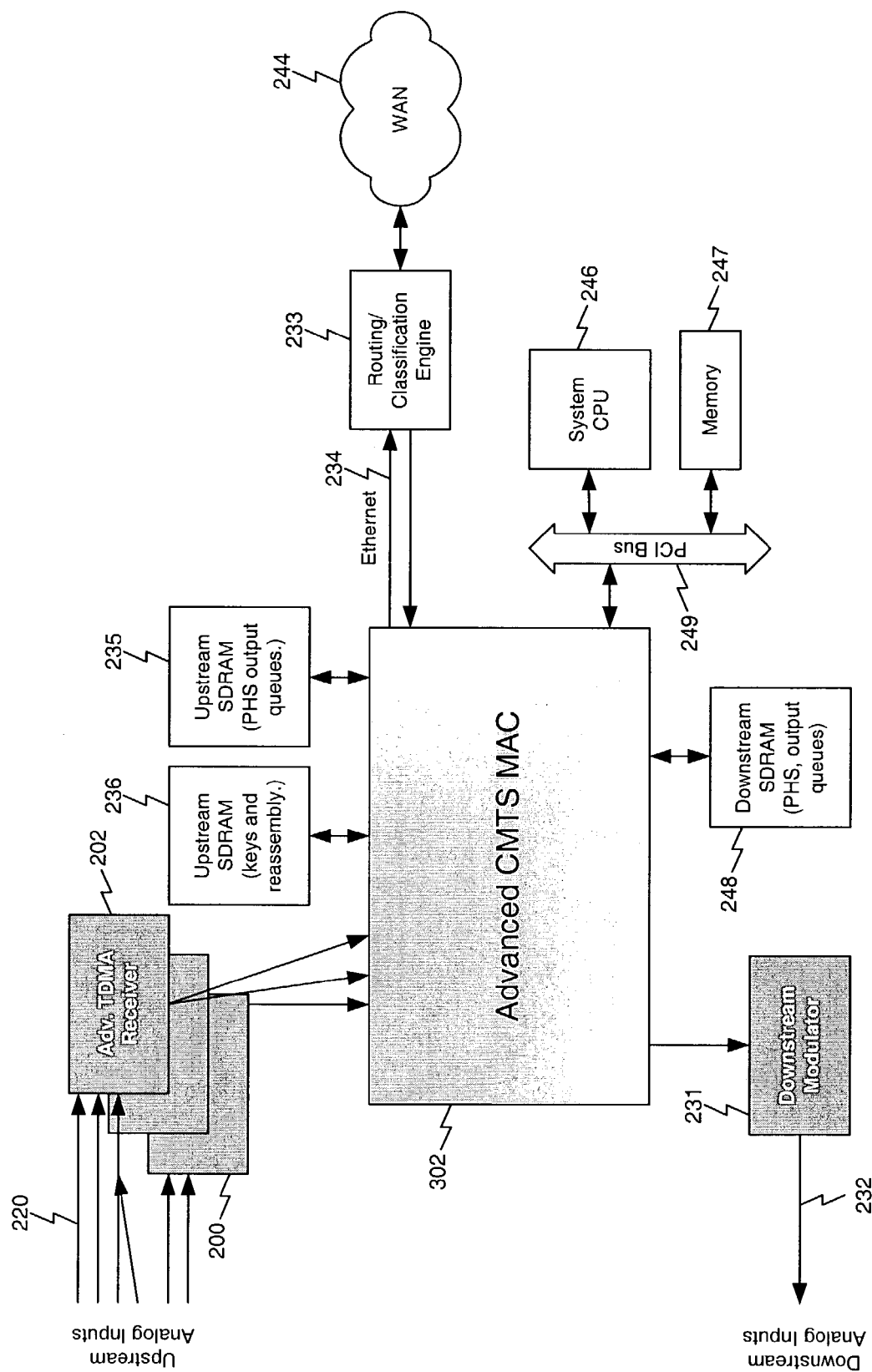
FIG. 3C is a diagram illustrating the head end architecture at a cable modem termination system (CMTS, or headend).

FIG. 3C further illustrates the configuration of the master headend 102 of one embodiment of the present invention. As illustrated in FIG. 3C, analog inputs 220 are received by a burst receiver 202. The burst receiver 202 communicates with the MAC 302.

The MAC 302 communicates over the Ethernet 234 with a Routing/Classification Engine 233, which in turn is connected to a Wide Area Network 244 (WAN). The MAC 302 utilizes upstream SDRAM 236 for keys in reassembly, and further utilizes upstream SDRAM 235 for output queues.

The MAC 302 is connected to a PCI bus 249, and through the PCI bus 249 to a System CPU 246 and a System Memory 247. The MAC 302 is further connected to a downstream SDRAM 248. Data flows through the downstream modulator 231, and is then output as downstream analog transmission 232.

Figure 4:
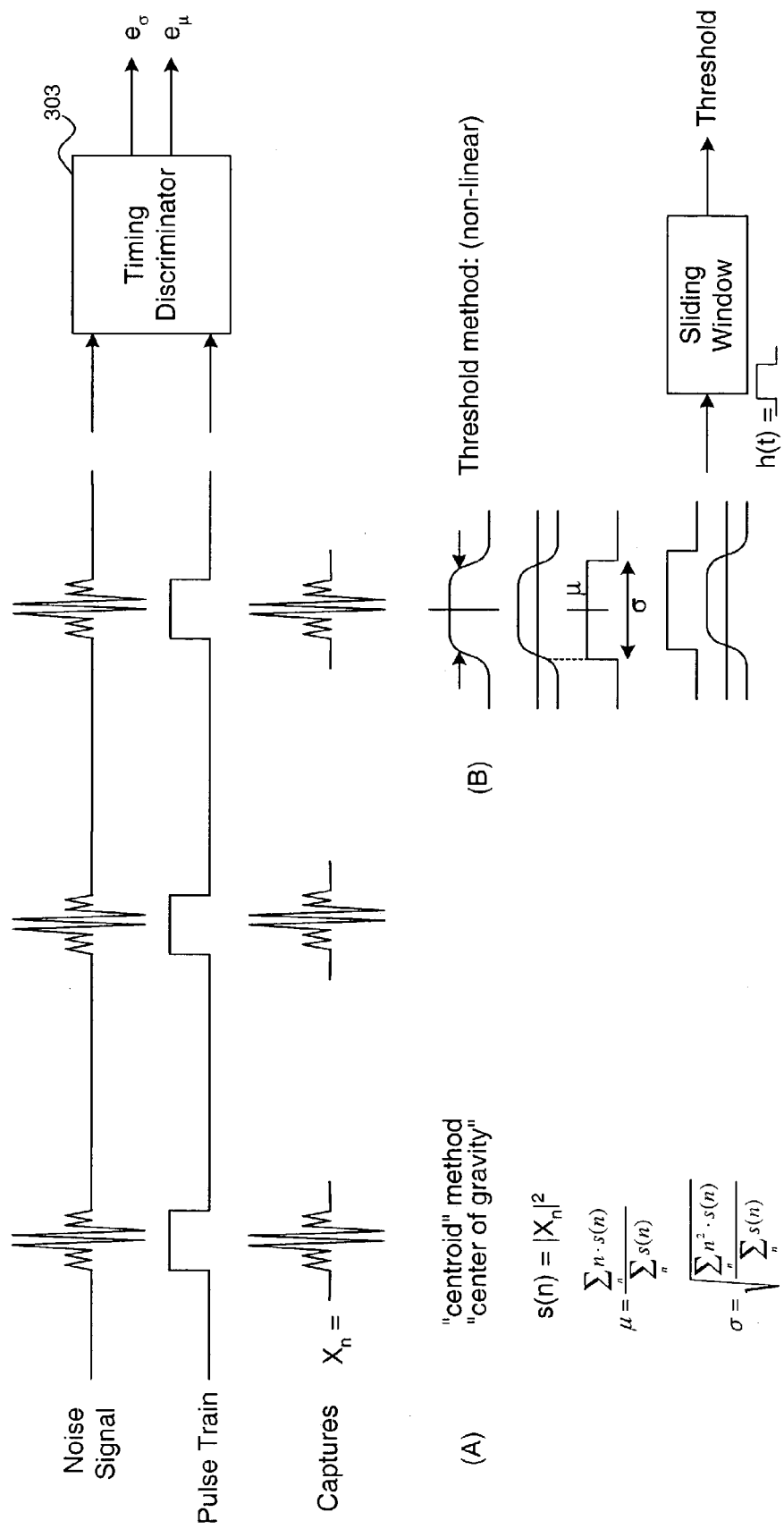
FIG. 4 illustrates two methods of determining periodic burst noise parameters.

FIG. 4 illustrates alternative methods of determining $\mu$ and $\sigma$. As shown in FIG. 4, a linear method of determining $\sigma$ (portion A of the figure) uses a center of gravity, or centroid method, where $\mu$ is defined as the centroid of the energy distribution, The signal distribution vs. time s(n) may be defined as $s(n)=|X_n|^2$ or a similar definition.

$$\mu = \frac{\sum_n n \cdot s(n)}{\sum_n s(n)}$$

and $\sigma$ is defined as in conventional Gaussian normal functions $$\sigma = \sqrt{\frac{\sum_n n^2 \cdot s(n)}{\sum_n s(n)}}$$

Another way to define $\mu$ and $\sigma$ is shown in portion B of FIG. 4, which uses a nonlinear (threshold) method. Using the threshold method, the noise burst is passed through a low pass filter (for example, a sliding window), and then through a threshold determiner, such that the width of the noise impulse defined where its amplitude is above a threshold is defined as the $\sigma$, and the $\mu$ is (for example) the geometric center of the pulse. The sliding window before the threshold detector stretches out the noise pulse, and smoothes it out. It is believed that this method has some performance advantages over the linear method described above, in addition to being simpler to implement.

Furthermore, a low pass filter is particularly useful where the duration of the burst spans several symbols. This avoids a situation of having to make a decision one symbol at a time, and has the advantage of a more robust detection of a burst noise event.

It is possible that initially, no periodic noise is present. If the packet error rate suddenly worsens, this is an indication to the headend of the presence of periodic noise. Another indication may come from a FFT analysis, where periodic noise typically has a $1/f^2$ type response. Thus, it is also important that the acquisition sequence be properly accomplished, prior to the tracking sequence described above. A number of methods exist for acquiring w, $f_r$, and $\tau_0$. In a typical system, the cable modem headend may notice that some of the packets are suddenly inundated with errors. Analysis of the arrival times of the errored packets may lead to a rough estimate of w, $f_r$, and $\tau_0$, which may then be fed as an initial estimate into the timing discriminator 303, and the PLL will then gradually arrive at a more accurate estimate, as discussed above. Initially, w may be fairly large, and will progressively get smaller and smaller, as the PLL settles.

Another method for acquiring w, $f_r$, and $\tau_0$ may include detection of energy in an empty slot. In a typical TDMA or SCDMA system, there are usually some empty slots. Any energy in the empty slots is presumptively noise (though not necessarily periodic noise).

Another alternative method for acquiring w, $f_r$, and $\tau_0$ is slewing, a common PLL technique. The slewing technique purposely offsets $\tau_0$, $f_r$ and w initially. Upon detection of errors, the error locations are used to initialize the PLL, which is then allowed to track. Eventually the PLL reaches equilibrium (the condition of $e_\mu$ and $e_\sigma$ nearly zero).

Figure 6:
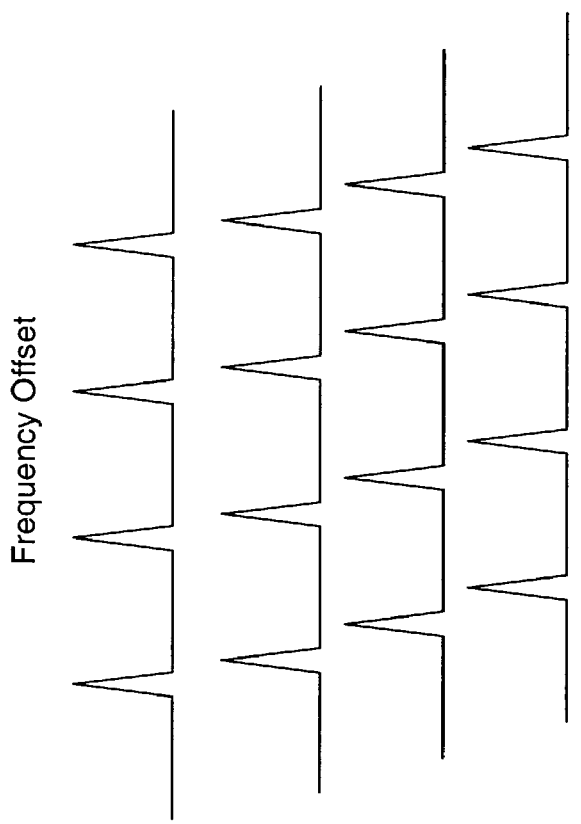
Figure 5:
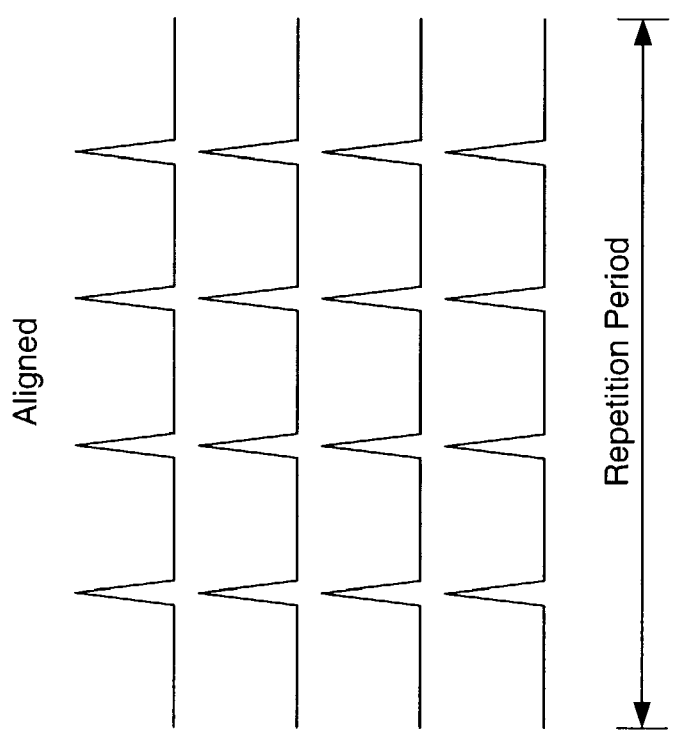

Another method for acquiring w, $f_r$, and $\tau_0$ is the raster method. FIGS. 5 and 6 illustrate the raster method. FIG. 5 shows a noise impulse train, wrapped around from line to line. With the repetition period T chosen perfectly, the pulses will "line up" vertically. This is a phenomenon well familiar to electronics engineers, and it is easy to detect by eye with a signal analyzer. It is also straightforward to detect such an alignment of the noise pulses using a software program, since it essentially amounts to doing modulo arithmetic, with different modulos, and applying histogram techniques.

FIG. 6 is an example of where the repetition period is chosen improperly. It is easy to tell by eye on a signal analyzer that there is periodic noise, and that a parameter on the signal analyzer needs to be tuned in order to calculate a proper repetition (which relates to an accurate estimate of $f_r$). It is equally straightforward to do this in software, as discussed above.

FIG. 7 shows an example of some noise pulses that may be missing. As discussed above, it is easy to tell by eye that there is still periodic noise, notwithstanding the absence of a few occasional pulses. As with FIG. 6, it is relatively straightforward to write software that would account for this condition.

Additionally, with the raster method, it is possible to handle the case of two different periodic noise sources at the same frequency, but having different phases. The eye, or properly designed software, can detect the presence of two (or more) line patterns in the raster scan. Similarly, it is possible to handle two (or more) sources of periodic noise with different frequencies $f_r$, where the multiple line components in the raster will have different slopes.

The present invention allows optimization of the overall channel transmission characteristics and data throughput. For example, by minimizing the empty slot duration, more time is available for data transmission. Furthermore, a typical channel 301 has both periodic and non-periodic noise present on the channel. By parameterizing the periodic noise, it is easier to deal with the non-periodic noise, since the periodic noise may be subtracted out from the overall noise on the channel 301. Furthermore, with the periodic noise parameterized, the headend may decide that, notwithstanding the noise, it is still possible to transmit data when the periodic noise is present (if the noise is considered "not too bad", i.e., below a certain threshold level). Thus, even if it is not possible to transmit data at a high modulation rate, it may still be possible to transmit data when the periodic noise is present, but using a more robust modulation scheme, such as QPSK instead of higher order QAM, or using more robust error detection and correction mechanisms.

Figure 8:
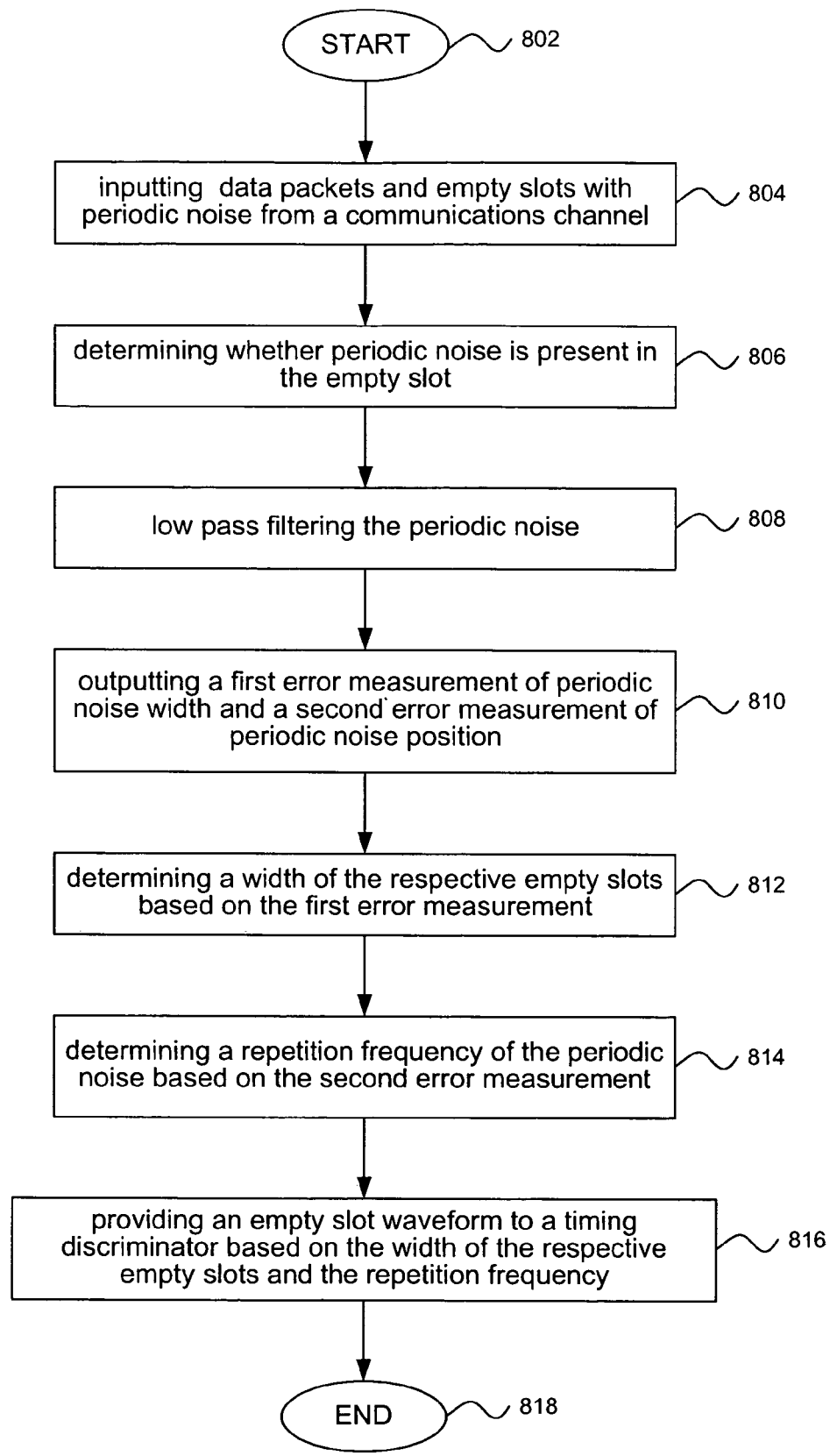
FIG. 8 illustrates an exemplary method of the present invention.

FIG. 8 is a flowchart illustrating a method 800 for periodic noise avoidance, according to an embodiment of the present invention. Method 800 begins at step 802 and immediately proceeds to step 804. In step 804, data packets and empty slots with periodic noise are input from a communications channel. In step 806, it is determined whether periodic noise is present in the empty slot. In step 808, the periodic noise is low pass filtered. In step 810, a first error measurement of periodic noise width and a second error measurement of periodic noise position are output. In step 812, a width of the respective empty slots is determined based on the first error measurement. In step 814, a repetition frequency of the periodic noise is determined based on the second error measurement. In step 816, an empty slot waveform is provided to a timing discriminator based on the width of the respective empty slots and the repetition frequency. In step 818, method 800 terminates.

Figure 9:
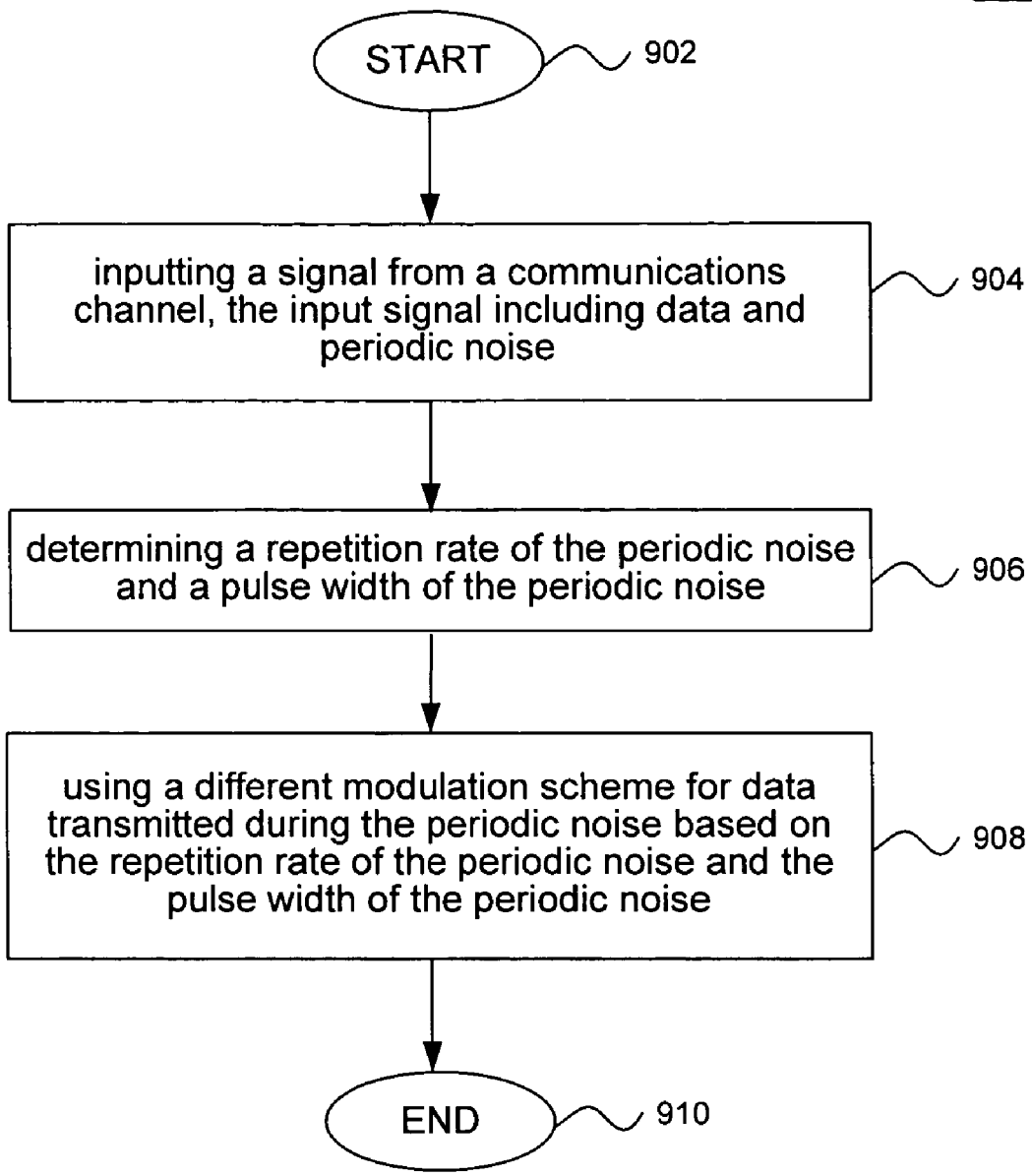
FIG. 9 is a flowchart illustrating a method for transmitting data during periodic noise according to an embodiment of the present invention.

FIG. 9 is a flowchart illustrating a method 900 for transmitting data during periodic noise, according to an embodiment of the present invention. Method 900 begins at step 902 and immediately proceeds to step 904. In step 904, a signal including data and periodic noise is input from a communications channel. In step 906, a repetition rate of the period noise and a pulse width of the periodic noise are determined. In step 908, a different modulation scheme is used for data transmitted during the periodic noise based on the repetition rate of the periodic noise and the pulse width of the periodic noise. Method 900 terminates at step 910.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for periodic noise avoidance comprising:
   a timing discriminator that receives an input signal from a communications channel, the input signal including data packets and empty slots with periodic noise, and outputs a first error measurement of periodic noise width and a second error measurement of periodic noise position;
   a first loop filter having as an input the first error measurement and outputting a width of the respective empty slots;
   a second loop filter having as an input the second error measurement and outputting a repetition frequency of the periodic noise; and
   an oscillator having as an input the width of the respective empty slots and the repetition frequency, and outputting an empty slot waveform to the timing discriminator.

2. The system of claim 1, further including an energy detection logic that determines whether periodic noise is present in the input signal.

3. The system of claim 1, wherein the oscillator is a numerically controlled oscillator.

4. The system of claim 1, wherein the oscillator is controlled by a media access controller (MAC), the MAC using the repetition frequency, the width of the respective empty slots, and a phase estimate from the oscillator to control the oscillator.

5. The system of claim 1, wherein the periodic noise is low pass filtered.

6. The system of claim 1, wherein the periodic noise width is determined using a center of gravity method.

7. The system of claim 1, wherein the periodic noise width is determined using a nonlinear threshold method.

8. The system of claim 1, wherein initial conditions for the timing discriminator are provided by slewing the timing discriminator, the first and second loop filters and the oscillator.

9. The system of claim 1, wherein initial conditions for the timing discriminator are provided by using a raster method on the input signal.

10. The system of claim 1, wherein a modulation scheme of the data packets is dynamically adjusted based on parameters of the periodic noise.

11. The system of claim 1, wherein data is transmitted in conjunction with the periodic noise.

12. The system of claim 1, wherein duration of the empty slots is adjusted based on the width of the periodic noise.

13. A method for periodic noise avoidance comprising:
    inputting a signal from a communications channel, the input signal including data packets and empty slots with periodic noise;
    outputting a first error measurement of periodic noise width and a second error measurement of periodic noise position;
    determining a width of the respective empty slots based on the first error measurement;
    determining a repetition frequency of the periodic noise based on the second error measurement; and
    providing an empty slot waveform to a timing discriminator based on the width of the respective empty slots and the repetition frequency.

14. The method of claim 13, further including the step of determining whether periodic noise is present in the empty slot.

15. The method of claim 13, further including the step of low pass filtering the periodic noise.

16. The method of claim 13, further including the step of determining the periodic noise width using a center of gravity method.

17. The method of claim 13, further including the step of determining the periodic noise width using a nonlinear threshold method.

18. The method of claim 13, wherein initial conditions for the timing discriminator are provided by using a raster method on the input signal.

19. The method of claim 13, wherein a modulation scheme of the data packets is dynamically adjusted based on parameters of the periodic noise.

20. The method of claim 13, wherein data is transmitted when periodic noise is present.

* * * * *